INVENTOR.
ELLIS HUMPHREYS
BY Robert E. Zener

ATTORNEY

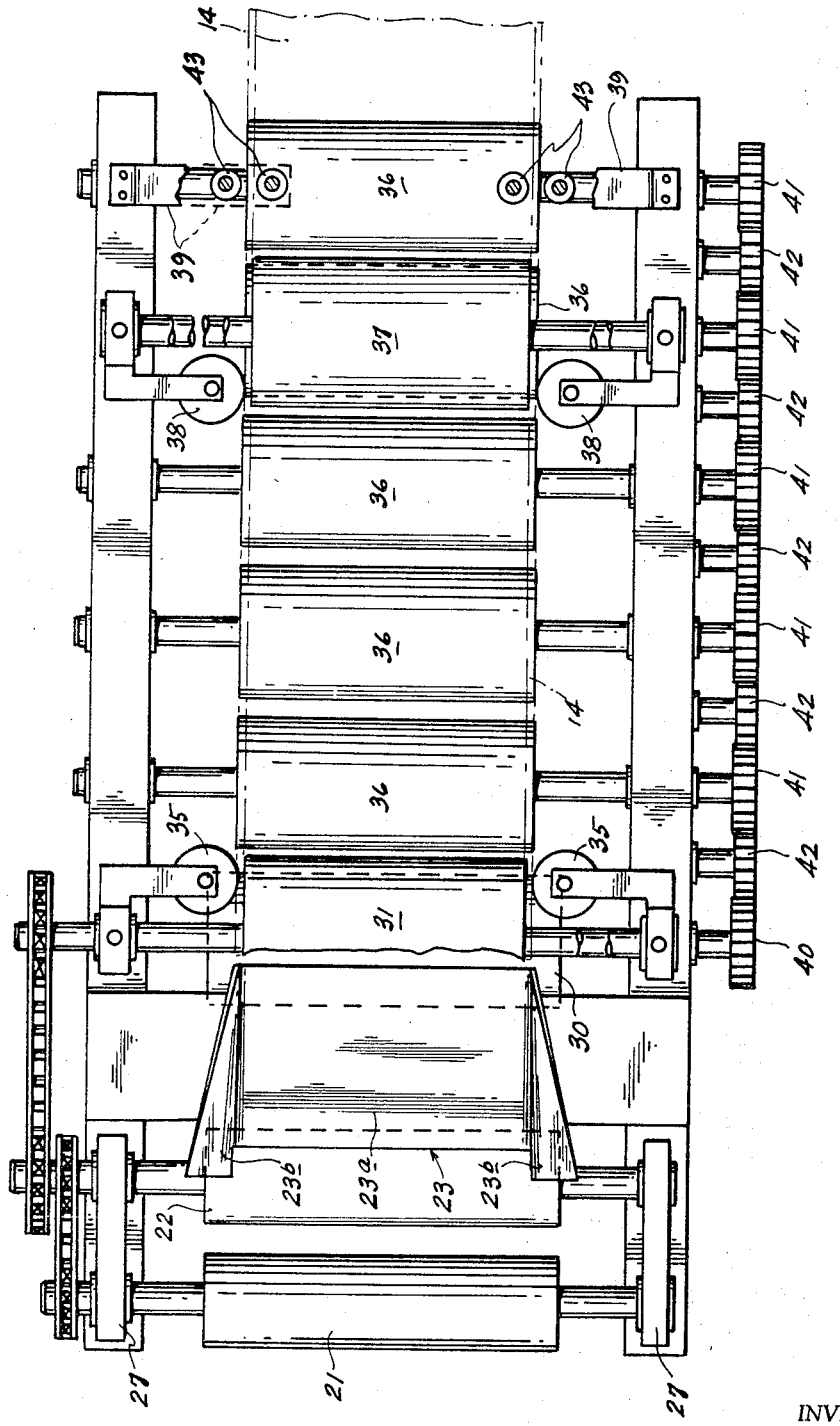

United States Patent Office 3,420,650
Patented Jan. 7, 1969

3,420,650
METHOD AND APPARATUS FOR FORMING
GLASS CHANNELS
Ellis Humphreys, St. Louis, Mo., assignor to Mississippi
Glass Company, St. Louis, Mo., a corporation of New
York
Filed Feb. 8, 1966, Ser. No. 525,930
U.S. Cl. 65—94                                    20 Claims
Int. Cl. C03b 13/18

ABSTRACT OF THE DISCLOSURE

Apparatus and method for fabricating elongate channel shaped webs of rolled glass wherein the width of the undeformed flat web is selectively adjusted within predetermined limits by controlled variation of longitudinal tension applied thereto prior to deformation thereof.

The present invention relates to a method and apparatus for forming a glass channel element by drawing a flat ribbon of glass in plastic condition through a flange forming ramp, which bends the edges of the ribbon upward to form flanges along the edges of the ribbon.

The use of a flange-forming ramp for imparting a channel shape to a plastic ribbon of glass is known in the art. Such a ramp has a generally trapezoid shaped bed portion, across which the ribbon is drawn, and progressively graduated and smoothly curved side walls along the converging sides of the trapezoid. The side walls are bent upward progressively along the converging sides starting from the wide end of the trapezoid at which they are in the plane of the bed, and bend gradually upward until they are substantially upright at the narrow end of the bed. The ribbon is wider than the narrow end of the ramp and, as it is drawn through the ramp from the wide end, the edges of the ribbon are folded up by the side walls.

Heretofore, in the manufacture of glass channel elements the ribbon of glass has been drawn through a pair of shaped forming rolls to give it the desired channel configuration. Such rolling is done while the ribbon is in plastic condition and is accomplished by displacing the web portion between parallel roller surfaces while pressing the side flanges between the extending side flanges of one roll and the ends of the second roll riding on the web between the flanges.

Such rolling deformation tends to elongate the web of the channel more than the flanges and produce unsightly ripples or creases in the web. Moreover, the end surfaces of the roll against which the flanges are pressed wipe across the inside surfaces of the flanges and tend to produce visible wipe marks on the flanges.

It is an object of this invention to provide a method and apparatus for forming a glass channel element to predetermined dimensions without rolling whereby distortions produced in the glass by rolling are eliminated.

Another object is to produce more uniform glass channels and to produce the channels at a higher rate of production and with fewer mechanical elements than they are produced by the forming techniques previously known.

In accordance with the present invention, glass channels are formed by applying adjusted longitudinal tension to a plastic ribbon of glass to control the width of the ribbon introduced into a flange-forming ramp so that the flanges folded up from a predetermined width of ribbon defined by the ramp will be the depth desired for the finished product. The ribbon as so formed is permitted to cool, or is cooled, sufficiently as it moves through the ramp to be in essentially self-supporting, but yet still deformable, condition as it emerges from the ramp. The ribbon, which is now in the form of a generally U-shaped channel with flanges at the sides of a central web, is passed through dressing apparatus which applies sufficient pressure to the web to correct any irregularities therein and to define the inside corners between the web and the flanges. At the same time the dressing apparatus straightens and aligns the flanges, if such is necessary. Thereafter the ribbon passes into a lehr for annealing after which it is cut into separate channel elements of the desired lengths.

A particular feature of the method and apparatus of this invention is the application of adjusted longitudinal tension to the plastic ribbon of glass to effect adjustment of its width before it enters the ramp whereby the depth of the flanges in the finished product is established. The application of such tension is desirably applied while maintaining the temperature and thickness of the glass as it leaves the forming rolls substantially constant. In the apparatus of this invention the ribbon of glass is formed by a pair of forming rolls, supported by a pair of driven carrier rolls prior to its introduction to the ramp, and is engaged by another pair of rolls as it emerges from the flange-forming ramp. At least one roll in each pair is driven. Tension is applied to the section of ribbon by rotating the downstream rolls at a faster rate than the forming rolls and the tension is adjusted by adjusting the relative speeds of rotations therebetween.

An additional amount of longitudinal tension is applied by gravity by the mounting of the flange forming ramp on a level appreciably below the bite of the forming rolls. Such gravitationally induced tension is then supplemented to the desired degree by adjusting the relative rates of rotation of the aforesaid driven rolls. This arrangement provides a simple and effective means of adjusting the width of the ribbon and in practice variations of an inch or more have been readily attained.

The above and further objects, features and advantages of the invention will be more fully understood from the following detailed description of an exemplary embodiment of the invention, which is described with reference to the accompanying drawings. In the drawings:

FIG. 3 is a top plan view of the parts of the apparatus shown in FIG. 2.

Figure 1:
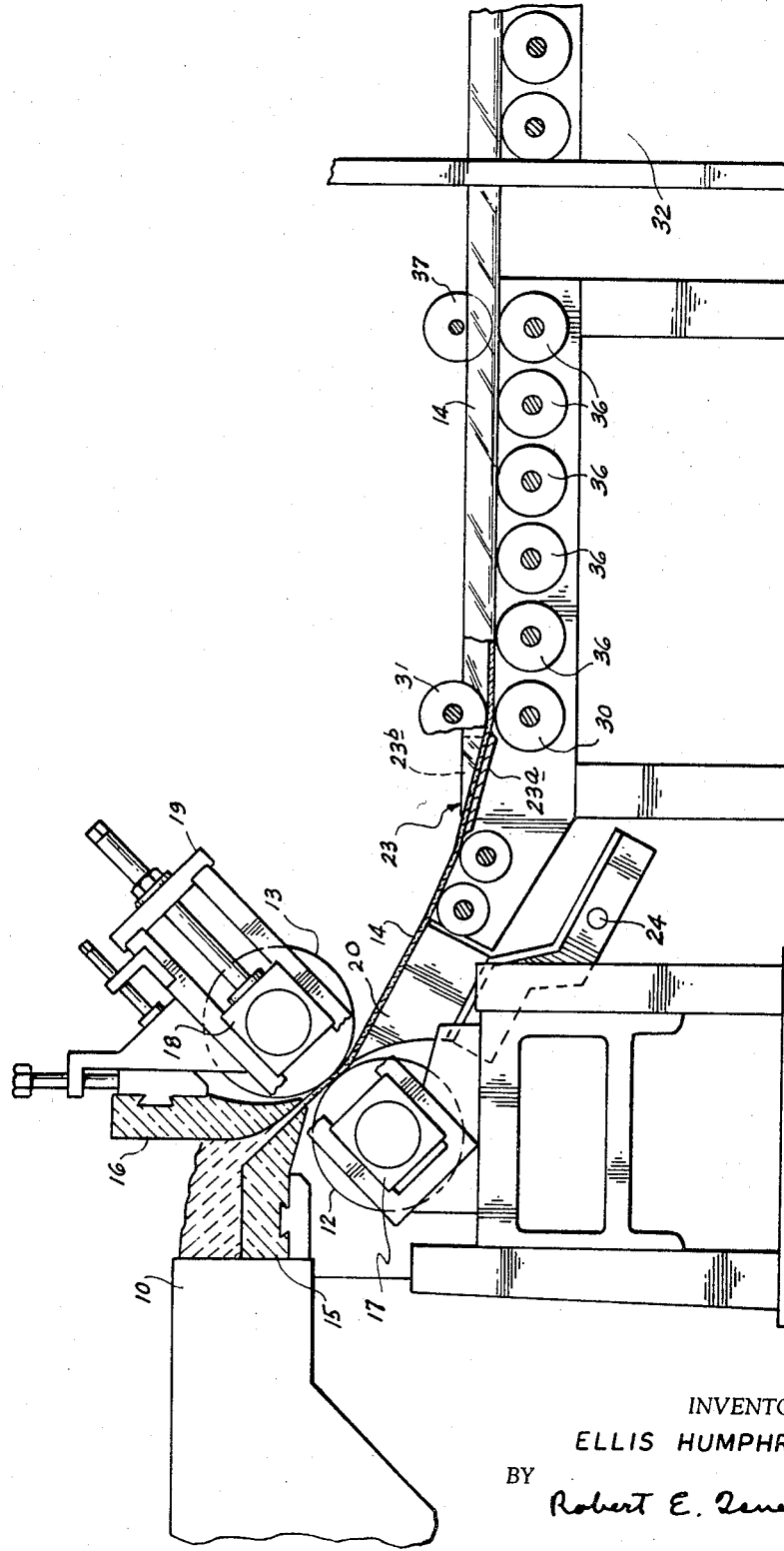
FIG. 1 is a side elevation of apparatus in accordance with the invention.

Referring to FIG. 1, glass to be formed into channel elements in accordance with the invention is formulated in a furnace 10 from which molten glass flows out through an aperture 11 in the wall of the furnace and into the bite of a pair of forming rolls 12 and 13 which forms the molten glass into a continuous ribbon 14. Refractory aperture defining elements 15 and 16 adjacent the opposite sides of the aperture in the furnace are adjustably mounted to control the size of the aperture 11.

The forming rolls 12 and 13 are journalled at one end respectively in bearing blocks 17 and 18 which are slidably mounted in frames 19. Their other ends, which do not show in the drawing, are journalled in similar blocks 17 and 18 slidable in a similar frame 19 at the other side of the apparatus. The forming rolls 12 and 13 are thus supported in parallel relation in the frames 19 and are adjustable relative to each other within the frames to vary the size of the space between the rolls. This space determines the thickness of the ribbon being formed. The rolls 12 and 13 are driven by a motor (not shown) and are adjustable in speed.

The frames 19 are inclined away from the furnace and molten glass from the furnace passes downward between the rolls. Rotation of the rolls forms the glass into a ribbon 14 which emerges from the bite of the rolls onto an inclined dead plate 20. The ribbon 14 moves down over the surface of the dead plate 20 onto a pair of driven carrier rolls 21 and 22. The ribbon then passes into the wide upstream end of a flange-forming ramp 23.

As shown, the flange-forming ramp 23 is at a level below the bite of the forming rolls 12 and 13. The support surface, provided for the ribbon 14 by the dead plate 20 and carrier rolls 21 and 22, inclines downward from the rolls to the ramp and may suitably be inclined at an angle of about 25–30 degrees. Thus gravitational pull on the portion of the ribbon on the inclined surface applies longitudinal tension to that portion of the ribbon. In practice a height differential of 18 to 20 inches between the bite of the forming rolls and the ramp 23 have been found particularly suitable to create a constant of longitudinal tension for stabilizing the width of the ribbon as it moves down the incline to the ramp. As mentioned above, this constant of tension may be supplemented by additional longitudinal tension which is applied in accordance with the invention to control the width of the ribbon.

The height of the forming rolls 12 and 13 is adjustable by moving them up or down in the frames 19. When their height is altered the positions of the dead plate 20 and carrier rolls 21 and 22 are also adjusted in order to maintain the support surface for the ribbon between the rolls and the ramp 13. For this purpose the dead plate 20 is mounted to be moved to adjusted positions about a pivot point 24. The frames 19 in which the forming rolls 12 and 13 are supported are inclined to be approximately tangent to the arc described by movement of the dead plate 20 to adjusted positions about the pivot point 24. Thus the upstream end of the dead plate is close to the bite of the forming rolls over a range of adjustments.

Figure 2:
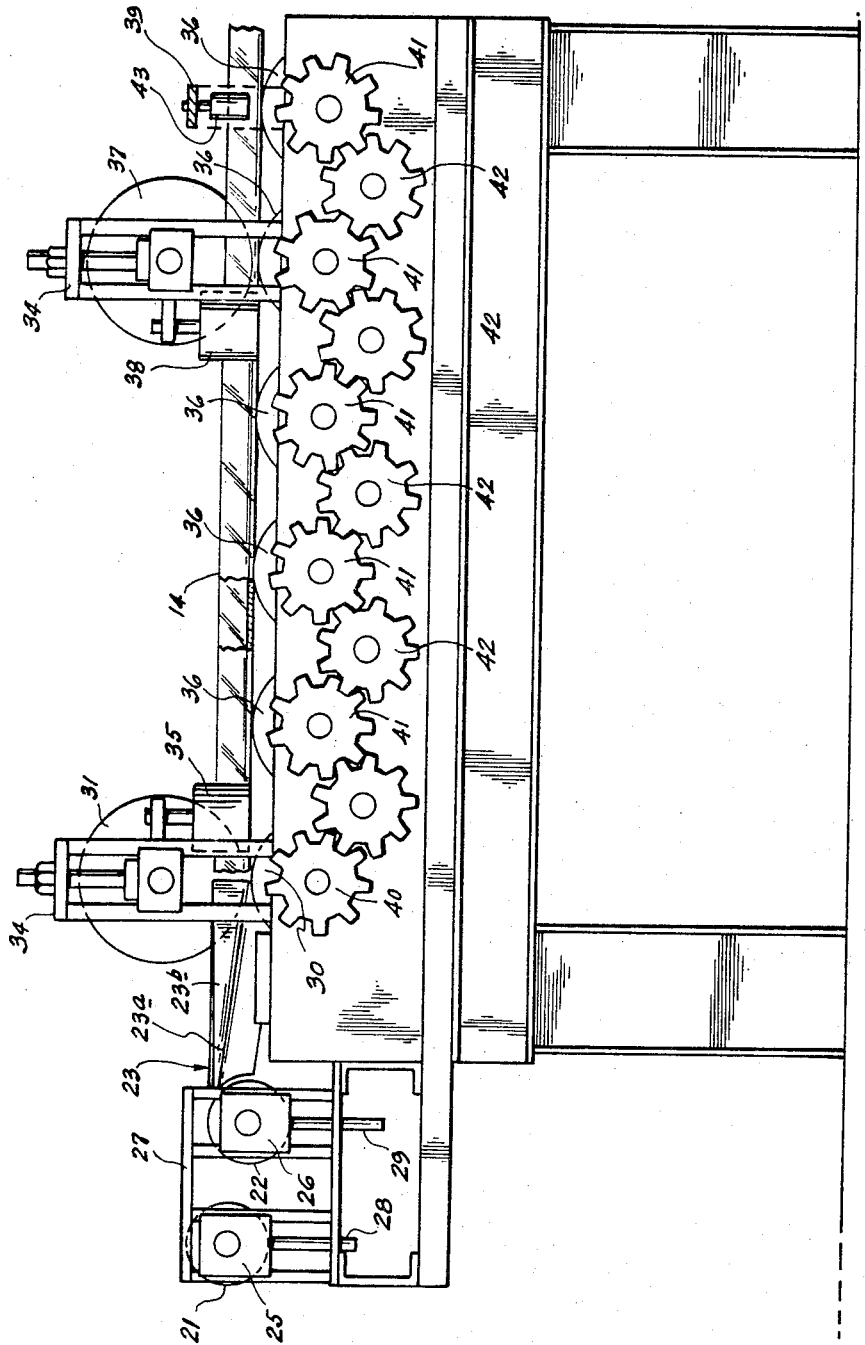
FIG. 2 is a side elevation of parts of the apparatus of FIG. 1; the parts which are shown being the pair of conveyor rolls at the upstream end of the flange forming ramp, the ramp and the dressing mechanism.

The carrier rolls 21 and 22 are vertically adjustable to maintain them on a level to complete a smooth support surface between the lower end of the dead plate 20 and the ramp 23 when the position of the dead plate is altered. As shown in FIGS. 2 and 3 the carrier rolls 21 and 22 are journalled respectively in bearing blocks 25 and 26, which are vertically slidable in frames 27 and held in adjusted position therein by adjusting screws 28 and 29. The rolls 21 and 22 are driven by sprocket and chain connections to a motor, not shown, and conveniently have a common drive with the hereinafter described carrier rolls 30 and 36.

The flange-forming ramp 23 is inclined downward and comprises a flat bed portion 23a and side walls 23b. The side walls are in the plane of the bed portion at the upstream end of the ramp and are progressively graduated and smoothly curved upward from the bed portion toward the downstream end at which they are upright relative to the bed portion 23a. Therefore, the flat horizontal surface of the ramp 23 has a generally trapezoidal outline; the wider end of the trapezoid is the upstream end of the ramp and the narrow end is the downstream end. Thus, as the ribbon 14, which is wider than the downstream end of the bed 23a, moves through the ramp, the edges of the ribbon are progressively bent upward by the walls 23b and are upright relative to the central portion of the ribbon when the ribbon passes out the downstream end of the ramp. The ribbon then has the configuration of a channel element—flanges with a web between.

As the ribbon emerges from the ramp it passes between rolls 30 and 31 which are the first pair of rolls of dressing mechanism extending between the downstream end of the ramp 23 and a lehr 23. The dressing mechanism is adapted to straighten the flanges and the web if necessary and to correct their angular relation as it transports the ribbon to a lehr 23 in which the ribbon is annealed.

As shown in FIGS. 2 and 3, the support roll 30 is rotatably mounted adjacent the downstream end of the ramp 23 in position for the ribbon from the ramp to pass over it. The roll 30 is adapted to be driven by a sprocket and chain drive in common with rolls 21 and 22 and means (not shown) are included for speed adjustment thereof. The dressing roll 31 is supported above the roll 30 and is journalled in bearing blocks 33 which are freely slidable in a vertical path in frames 34. The roll 31 rests, under its own weight, on the web portion of the ribbon between the flanges formed at the edges of the ribbon by the ramp and extends the full width of the web between the flanges. Two vertical rolls 35 (FIG. 3) are rotatably mounted adjacent the respective ends of the roll 31 and are spaced from the ends for the flanges of the ribbon to pass between. The rolls 35 are parallel to the ends of the roll 31 and cooperate therewith to engage the flanges passing between for ensuring the straight alignment of the flanges. The roll 31 on the web of the ribbon levels the web and finishes the definition of the inside corners between the web and the flanges.

The roll 30 is driven, as mentioned above, and the roll 31, which need not be driven, is, in the embodiment shown, preferably positively driven to rotate at the same peripheral speed as the roll 30. As mentioned earlier, the rolls 30 and 31 (together with the rolls 21 and 22) are driven independently of the forming rolls 12 and 13 and by adjusting the relative speeds thereof the longitudinal tension applied to the portion of the ribbon exiting from the forming rolls is adjusted to control the width of the ribbon prior to its entry into the forming ramp.

As mentioned earlier, the temperature of the strip exiting from the furnace is controlled and the apparatus is arranged so that the ribbon 14 is maintained in sufficiently plastic condition as it travels from the forming rolls 12 and 13 into the flange forming ramp 23 so as to permit width variation in accord with the applied tension. As it emerges from the ramp it is cooled to a condition in which it is self-supporting but still retains a sufficient degree of plasticity to permit deformation thereof as it passes to the rolls 30 and 31.

The dressing mechanism comprises the aforementioned rolls 30 and 31; a sequence of conveyor rolls 36; another dressing roll 37 and cooperating vertical rolls 38, which are respectively similar to the dressing roll 31 and vertical rolls 35; and a pair of flange stabilizing devices 39. The conveyor rolls 36 are parallel to the roll 30 in a line to transport the ribbon to the lehr 32 and are driven from the roll 30 by a gear 40 which is fixed on the shaft of roll 30 and drivingly connected to gears 41 on the shafts of the rolls 36 by intermediate idler gears 42.

The dressing roll 37, which is not driven, is otherwise similar in construction and operation to the dressing roll 31 and has vertical rolls 38 cooperating with it to ensure the straight alignment of the flanges of the ribbon in the same manner as the vertical rolls 35 cooperate with the dressing roll 31. As shown, the dressing roll 37 and associated vertical rolls 38 are downstream from the roll 31 and provide a final straightening of the web and flanges of the ribbon before the ribbon passes into the lehr 32. The flange stabilizing devices 39 are at the end of the sequence of conveyor rolls 36 to prevent deflection of the flanges of the ribbon just before it enters the lehr. They are at opposite sides of the path of the ribbon on the conveyor rolls 36 and each comprises a pair of parallel vertical rolls 43 which are supported to extend down and bracket the flange of the ribbon. The rolls 43 are spaced apart so as to be out of contact with the flange passing between them so long as the flange is properly aligned.

In operation the ribbon 14 is formed by the forming rolls 12 and 13 and its width is controlled by adjustment of the relative speeds between the forming rolls and the carrier rolls 21, 22, 30 and 36 to produce flanges of the desired width at the edges of the ribbon when it passes through the ramp 23. The ribbon is in plastic condition between the forming rolls and the ramp so that the adjustable longitudinal tension applied to the ribbon is effective to control its width and so that the ribbon is readily shaped by the ramp. When the ribbon emerges from the ramp it is self-supporting and has the dimensions and channel configuration desired. It is then passed through the dressing apparatus which straightens the web and flanges formed by the ramp, finishes or sharpens definition of the interior corners between the web and flanges and adjusts and stabilizes the angular alignment of the flanges. The ribbon is then annealed in the lehr and thereafter cut into channel elements of the desired length.

This apparatus and method produces channel elements of uniform quality at a good rate of production. The actual speed of operation and degree of tension depends on the characteristics of the glass formulation—its viscosity characteristics and setting speed.

The above description is of an exemplary embodiment of the invention and it will be understood that variations and modifications may be made in method and in the apparatus described without departing from the scope of the invention defined by the following claims.

What I claim is:

1. A method of forming glass channel elements which comprises forming a ribbon of glass of predetermined width, applying longitudinal tension to said ribbon while it is in plastic condition, adjusting the amount of said tension to vary the width of said ribbon and drawing said ribbon under said adjusted tension while turning the side edges of the ribbon substantially perpendicular to the surface thereof while it is still in plastic condition, said width being selected to provide flanged edges of a predetermined dimension after said channel elements are formed.

2. The method of claim 1 in which said ribbon is permitted to cool to self-supporting condition concurrent with the conclusion of said edge turning thereof and in which means are applied to dress the angular relation of the upturned edges of the ribbon and the web between said edges while said ribbon is in self-supporting condition and before it solidifies to rigid condition.

3. Apparatus for forming glass channel elements comprising means including a pair of driven forming rolls for forming a plastic ribbon of rolled glass of predetermined width, a flange-forming ramp to turn the side edges of the ribbon upward during its passage therethrough, means for drivingly engaging said ribbon between said rolls and said ramp and means for adjusting the relative speeds between said forming rolls and said driving means to adjust the longitudinal tension in the portion of said ribbon disposed intermediate said forming rolls and said ramp for selectively controlling the width of the portion of said ribbon entering said ramp.

4. The apparatus of claim 3 including an inclined support surface disposed intermediate the forming rolls and the flange forming ramp to provide gravitationally induced longitudinal tension in the portion of said ribbon passing over said support surface.

5. The apparatus of claim 3 in which said support surface is inclined downward between about 25° to 30° from the bite of the forming rolls.

6. The apparatus of claim 3 in which said ramp is about 18 to 20 inches below the bite of said forming rolls.

7. The apparatus of claim 3 including a set of dressing rolls drivingly engaging said channel as it leaves said ramp.

8. The apparatus of claim 3 including means for dressing the angular relation of the upturned edges of said ribbon and the web between said edges after the ribbon emerges from said ramp and before it has set to rigid condition.

9. Apparatus for forming glass channel elements comprising means including a cooperating pair of rotatable forming rolls adapted to receive molten glass at one side and, when rotated, to form said glass into a plastic ribbon of glass of predetermined width emerging from the bite of the rolls at the other side, means for supplying molten glass to said forming rolls and drive means for rotating at least one of them at an adjustable speed, a flange-forming ramp having a generally flat downwardly inclined base which is trapezoidal in outline and side walls bent progressively upward from said base along the converging edges of the trapezoid, said side walls being in the plane of the base at the wide end of the trapezoid and extending upward substantially at right angles thereto at the narrow end, a support surface for said ribbon from said forming rolls to the wide end of said ramp for passing said ribbon in plastic condition onto the ramp, a pair of rolls rotatably mounted at the narrow end of said ramp in cooperating relation to engage upper and lower surfaces respectively of a ribbon emerging from the narrow end of said ramp, drive means for rotating at least one of said latter rolls at an adjustable speed, said latter drive means and said drive means for rotating the forming rolls being independent whereby the relative speeds of the respective rolls are adjustable for adjusting the amount of tension applied to a ribbon of glass passing from the forming rolls to the ramp to selectively control the width thereof.

10. The apparatus of claim 9 in which the wide end of said ramp is at a level below the level of the bite of said forming rolls.

11. The apparatus of claim 9 in which the wide end of said ramp is at a level below the level of the bite of said forming rolls and said flange forming ramp is inclined downward from its wide end.

12. The apparatus of claim 9 in which the wide end of said ramp is at a level between about 18 and 20 inches below the level of the bite of said forming rolls and at least a portion of said support surface is inclined downward at an angle of about 25° to 30°.

13. The apparatus of claim 9 in which the wide end of said ramp is at a level below the level of the bite of said forming rolls and in which said support surface comprises at least one rotatable roll adjacent the wide end of said ramp for said ribbon to pass thereover onto the ramp.

14. The apparatus of claim 9 in which the wide end of said ramp is at a level below the level of the bite of said forming rolls and in which said support surface comprises a pair of rolls in parallel side by side relation adjacent the wide end of said ramp for said ribbon to pass thereover onto the ramp, and a rigid member having a substantially flat supporting surface inclined from a point adjacent said bite to a point adjacent the uppermost surface of the upstream one of said side by side rolls, drive means for rotating said side by side rolls.

15. The apparatus of claim 14 in which said rigid member is pivotally mounted to pivot about a point generally below the upstream one of said side by side rollers for adjusting the angular degree of incline of its supporting surface, said forming rolls being adjustable along a path generally tangent to the arc described by the upstream end of said supporting surface when the rigid member is pivoted, and said side by side rolls each being mounted for adjustment of their vertical positions thereby to adjust the level of said bite of the forming rollers relative to the wide end of said ramp and to adjust the levels of the elements comprising said support surface in position to pass said ribbon from the forming rolls onto the ramp.

16. The apparatus of claim 9 in which the one of said pair of rolls at the narrow end of said ramp which is mounted to engage the upper surface of a ribbon emerging from the ramp is dimensioned to extend laterally across the width of the web of said ribbon between the flanges formed at the edges of the ribbon by said ramp and to rest on said web for dressing the angular relation between the web and the flanges and the corners between said apparatus including a pair of rolls rotatably mounted respectively at opposite sides of the path of a ribbon from the ramp and aligned to engage the respective outside vertical surface of said flanges, said latter rolls being aligned with the ends of the rolls which extend between said flanges to cooperate therewith for dressing the vertical alignment of the flanges.

17. The apparatus of claim 9 including a lehr, conveyor means for transporting a ribbon from said pair of rolls at the narrow end of the ramp to said lehr, and dressing rolls arranged along the path of said ribbon along said conveyor means, said dressing rolls including a pair of horizontal rolls rotatably mounted and spaced apart along said path, each of said horizontal rolls being mounted to rest on and axially across the web of a ribbon on said conveyor means and being dimensioned to extend across the width of the web between flanges formed at the edges of the web by said ramp, and a pair of vertical rolls rotatably mounted in line with the ends of said horizontal rolls respectively at opposite ends thereof and spaced from said ends an amount for said flanges to pass respectively between and in contact with the ends of the horizontal rolls and said vertical rolls, said vertical rolls being aligned to engage said flanges for dressing their vertical alignment.

18. The apparatus of claim 9 including two pairs of flange stabilizing rolls respectively at opposite sides of the path of said conveyor means and mounted along said path at a point on said path between the downstream one of said horizontal rolls and said lehr, each pair of said stabilizing rolls comprising a pair of vertical rolls rotatably mounted in parallel relation and spaced apart slightly more than the thickness of a flange formed on a ribbon of glass by said ramp, and each pair of said stabilizing rolls being supported in position straddling a flange of a ribbon on said conveyor means and being arranged to be out of contact with said flange so long as the flange is in a predetermined angular relation to the web of the ribbon thereby to resist excessive angular displacement of the flange from a predetermined alignment.

19. In combination with apparatus for forming glass channel elements, apparatus for dressing the web and flanges at the sides of the web of a glass channel element, in which the glass is in self-supporting but not rigid condition, comprising conveyor means for transporting a channel element thereon, a horizontal roll rotatably mounted above said conveyor means and being supported to rest on and axially across the web of a channel element on said conveyor means, said horizontal roll being dimensioned to extend across the width of the web between the flanges of said channel element, a pair of vertical rolls rotatably mounted in line with the ends of the horizontal roll respectively at opposite ends thereof and spaced from said ends an amount for said flanges to pass respectively between and in contact with the ends of the horizontal roll and the vertical rolls.

20. The dressing apparatus of claim 19, including a second horizontal roll and a second pair of vertical rolls associated therein, said second horizontal roll and pair of vertical rolls being spaced along said conveyor means from the first mentioned horizontal roll and vertical rolls and being supported and arranged relative to said conveyor means as the ones first mentioned.

References Cited

UNITED STATES PATENTS 3,226,219 12/1965 Jamnik _____ 65—94 X
3,245,771 4/1966 Jamnik et al. _____ 65—253 X DONALL H. SYLVESTER, *Primary Examiner.*

R. V. FISHER, *Assistant Examiner.*

U.S. Cl. X.R.

65—90, 101, 245, 253.